US008992331B2

(12) United States Patent
Chudek et al.

(10) Patent No.: US 8,992,331 B2
(45) Date of Patent: Mar. 31, 2015

(54) VARYING THICKNESS ARMREST WITH INTEGRATED MULTI-LEVEL BUTTON PANEL

(71) Applicant: WMS Gaming Inc., Waukegan, IL (US)

(72) Inventors: Christopher W. Chudek, Evanston, IL (US); Paul M. Lesley, Blue Island, IL (US); Scott Minch, Wheeling, IL (US)

(73) Assignee: WMS Gaming Inc., Waukegan, IL (US)

(*) Notice: Subject to any disclaimer, the term of this patent is extended or adjusted under 35 U.S.C. 154(b) by 51 days.

(21) Appl. No.: 13/628,512

(22) Filed: Sep. 27, 2012

(65) Prior Publication Data

US 2013/0079157 A1 Mar. 28, 2013

Related U.S. Application Data

(60) Provisional application No. 61/539,746, filed on Sep. 27, 2011.

(51) Int. Cl.
*G06F 17/00* (2006.01)
*G07F 17/32* (2006.01)

(52) U.S. Cl.
CPC .................................. *G07F 17/3216* (2013.01)
USPC ............................................................ 463/46

(58) Field of Classification Search
CPC ............................. A63F 13/08; G07F 17/3216
USPC .......................................... 463/30–33, 37, 46
See application file for complete search history.

(56) References Cited

U.S. PATENT DOCUMENTS

| | | | | |
|---|---|---|---|---|
| 4,398,723 | A | 8/1983 | Erickson et al. | 273/313 |
| 4,440,457 | A | 4/1984 | Fogelman et al. | 312/7.2 |
| 4,614,342 | A | 9/1986 | Takashima | 273/85 CP |
| D311,428 | S | 10/1990 | Sears | D21/37 |
| D316,117 | S | 4/1991 | Irwin | D20/4 |
| D319,077 | S | 8/1991 | Arato et al. | D20/6 |
| 5,114,157 | A | 5/1992 | Kita | 273/434 |
| 5,324,036 | A | 6/1994 | Morrow | 273/148 B |
| 5,456,468 | A | 10/1995 | Stringfellow et al. | 273/148 B |
| 5,676,231 | A | 10/1997 | Legras et al. | 194/206 |
| D386,883 | S | 11/1997 | Do et al. | D99/28 |
| 5,683,082 | A | 11/1997 | Takemoto et al. | 273/121 B |
| 5,799,767 | A | 9/1998 | Molbak | 194/217 |
| 5,813,914 | A | 9/1998 | McKay et al. | 463/46 |
| 5,848,932 | A | 12/1998 | Adams | 463/20 |
| 5,857,910 | A | 1/1999 | Watanabe et al. | 463/17 |
| 5,967,287 | A | 10/1999 | Cole | 194/344 |
| 6,019,207 | A | 2/2000 | Cole | 194/206 |
| 6,019,369 | A | 2/2000 | Nakagawa et al. | 273/246 |
| 6,117,010 | A | 9/2000 | Canterbury et al. | 463/20 |

(Continued)

*Primary Examiner* — Ronald Laneau
(74) *Attorney, Agent, or Firm* — Nixon Peabody LLP

(57) ABSTRACT

A gaming system includes a display mounted to a cabinet and configured to display an outcome of a wagering game, the outcome being randomly selected from a plurality of outcomes in response to receiving a wager. The gaming system further includes an armrest panel mounted to the cabinet and including a support padding having a wall thickness defined by an exterior surface and an interior surface. The wall thickness varies along a cross-section of the support padding. The armrest panel further includes a plurality of buttons integrated in the support padding for receiving inputs from a player, the plurality of buttons including a first button mounted on a first elevation of the support padding and a second button mounted on a second elevation of the support padding. The first elevation is higher than the second elevation relative to the interior surface.

20 Claims, 10 Drawing Sheets

(56) References Cited

U.S. PATENT DOCUMENTS

| | | | | |
|---|---|---|---|---|
| 6,138,814 | A | 10/2000 | Miller et al. | 194/350 |
| 6,173,955 | B1 | 1/2001 | Perrie et al. | 273/146 |
| 6,201,532 | B1 | 3/2001 | Tode et al. | 345/156 |
| D447,312 | S | 8/2001 | Swaine | D99/28 |
| 6,270,411 | B1 | 8/2001 | Gura et al. | 463/20 |
| 6,305,686 | B1 | 10/2001 | Perrie et al. | 273/146 |
| D451,145 | S | 11/2001 | Taxon | D20/8 |
| 6,315,660 | B1 | 11/2001 | DeMar et al. | 463/16 |
| 6,334,612 | B1 | 1/2002 | Wurz et al. | 273/143 R |
| 6,334,814 | B1 | 1/2002 | Adams | 463/20 |
| 6,340,158 | B2 | 1/2002 | Pierce et al. | 273/138.1 |
| 6,358,146 | B1 | 3/2002 | Adams | 463/20 |
| 6,358,147 | B1 | 3/2002 | Jaffe et al. | 463/20 |
| 6,398,219 | B1 | 6/2002 | Pierce et al. | 273/138.2 |
| 6,688,984 | B2 | 2/2004 | Cole | 463/46 |
| 7,374,491 | B1 | 5/2008 | Johnson | 463/46 |
| 7,513,830 | B2 * | 4/2009 | Hajder et al. | 463/46 |
| 8,113,517 | B2 | 2/2012 | Canterbury et al. | 273/148 B |
| 8,167,715 | B2 | 5/2012 | Lesley et al. | 463/30 |
| 2002/0022509 | A1 | 2/2002 | Nicastro, II et al. | 463/15 |
| 2004/0013489 | A1 | 1/2004 | Hanson et al. | 410/77 |
| 2006/0281559 | A1 | 12/2006 | Luciano | 463/46 |
| 2008/0261703 | A1 | 10/2008 | Luciano et al. | 463/46 |
| 2008/0293476 | A1 | 11/2008 | Luciano, Jr. et al. | 463/20 |
| 2009/0221375 | A1 | 9/2009 | Luciano, Jr. et al. | 463/46 |
| 2009/0275404 | A1 | 11/2009 | Kromydas | 463/29 |
| 2010/0120530 | A1 | 5/2010 | Lesley et al. | 463/30 |
| 2010/0124962 | A1 | 5/2010 | Chudek et al. | 463/13 |
| 2010/0234094 | A1 | 9/2010 | Gagner et al. | 463/20 |
| 2011/0111839 | A1 | 5/2011 | Lesley et al. | 463/25 |
| 2011/0111847 | A1 | 5/2011 | Lesley et al. | 463/30 |
| 2011/0263326 | A1 | 10/2011 | Gagner et al. | 463/34 |
| 2011/0269543 | A1 | 11/2011 | Johnson | 463/37 |
| 2011/0312410 | A1 | 12/2011 | Aoki et al. | 463/25 |
| 2012/0108333 | A1 | 5/2012 | Radek et al. | 463/36 |
| 2012/0302302 | A1 | 11/2012 | Hamlin et al. | 463/7 |
| 2012/0302323 | A1 | 11/2012 | Gagner et al. | 463/25 |
| 2012/0315971 | A1 | 12/2012 | Granger | 463/16 |
| 2012/0315985 | A1 | 12/2012 | Granger | 463/16 |
| 2012/0322564 | A1 | 12/2012 | Granger et al. | 463/46 |
| 2013/0023346 | A1 * | 1/2013 | Greenberg et al. | 463/46 |

* cited by examiner

VARYING THICKNESS ARMREST WITH INTEGRATED MULTI-LEVEL BUTTON PANEL

REFERENCE TO RELATED APPLICATIONS

This application is related to and claims priority to U.S. Provisional Patent Application Ser. No. 61/539,746, filed Sep. 27, 2011, and titled "Varying Thickness Armrest With Integrated Multi-Level Button Panel," which is incorporated herein in its entirety.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to a gaming apparatus, and methods for playing wagering games, and more particularly, to an armrest having a varying thickness and an integrated button panel for enhancing player comfort and ease of play.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options.

The gaming terminals typically include a cabinet for housing internal components and a game interface for accepting player inputs. Most game interfaces include a button panel having an array of buttons mounted on a generally horizontal plate and occupying a substantial area of a cabinet surface that is designated as an interface portion. Sometimes, a soft wrist support is positioned proximal to the button array for player comfort.

SUMMARY OF THE INVENTION

According to one aspect of the present invention, a gaming system includes a display mounted to a cabinet and configured to display an outcome of a wagering game, the outcome being randomly selected from a plurality of outcomes in response to receiving a wager. The gaming system further includes an armrest panel mounted to the cabinet and including a support padding having a wall thickness defined by an exterior surface and an interior surface. The wall thickness varies along a cross-section of the support padding. The armrest panel further includes a plurality of buttons integrated in the support padding for receiving inputs from a player, the plurality of buttons including a first button mounted on a first elevation of the support padding and a second button mounted on a second elevation of the support padding. The first elevation is higher than the second elevation relative to the interior surface.

According to another aspect of the invention, a gaming system includes a first gaming terminal, a second gaming terminal, and an armrest panel. The first gaming terminal has a first cabinet and at least one first display, the first display being mounted to the first cabinet and configured to display a first outcome of a first wagering game. The first outcome is randomly selected from a first plurality of outcomes in response to receiving a first wager. The second gaming terminal has a second cabinet and at least one second display, the second display being mounted to the second cabinet and configured to display a second outcome of a second wagering game. The second outcome is randomly selected from a second plurality of outcomes in response to receiving a second wager. The armrest panel is mountable to, one at a time, the first cabinet and the second cabinet, and includes a support padding having a varying wall thickness along a plurality of sections. The plurality of sections includes an armrest section. The armrest panel further includes a plurality of buttons integrated in the support padding for receiving inputs from a player. The plurality of buttons includes a first cluster of buttons and a second cluster of buttons, the first cluster of buttons being in a recessed position relative to the second cluster of buttons.

According to another aspect of the invention, a gaming terminal includes a cabinet, at least one display, and an armrest panel. The display is mounted to the cabinet and is configured to display an outcome of a wagering game, the outcome being randomly selected from a plurality of outcomes in response to receiving a wager. The armrest panel is mounted to the cabinet and includes a support padding having a plurality of integrated buttons, the support padding having a plurality of sections with varying wall thickness. The plurality of integrated buttons includes a first button and a second button, the first button being located, with respect to a player position, in a recessed position relative to a second button.

Additional aspects of the invention will be apparent to those of ordinary skill in the art in view of the detailed description of various embodiments, which is made with reference to the drawings, a brief description of which is provided below.

Figure 1:
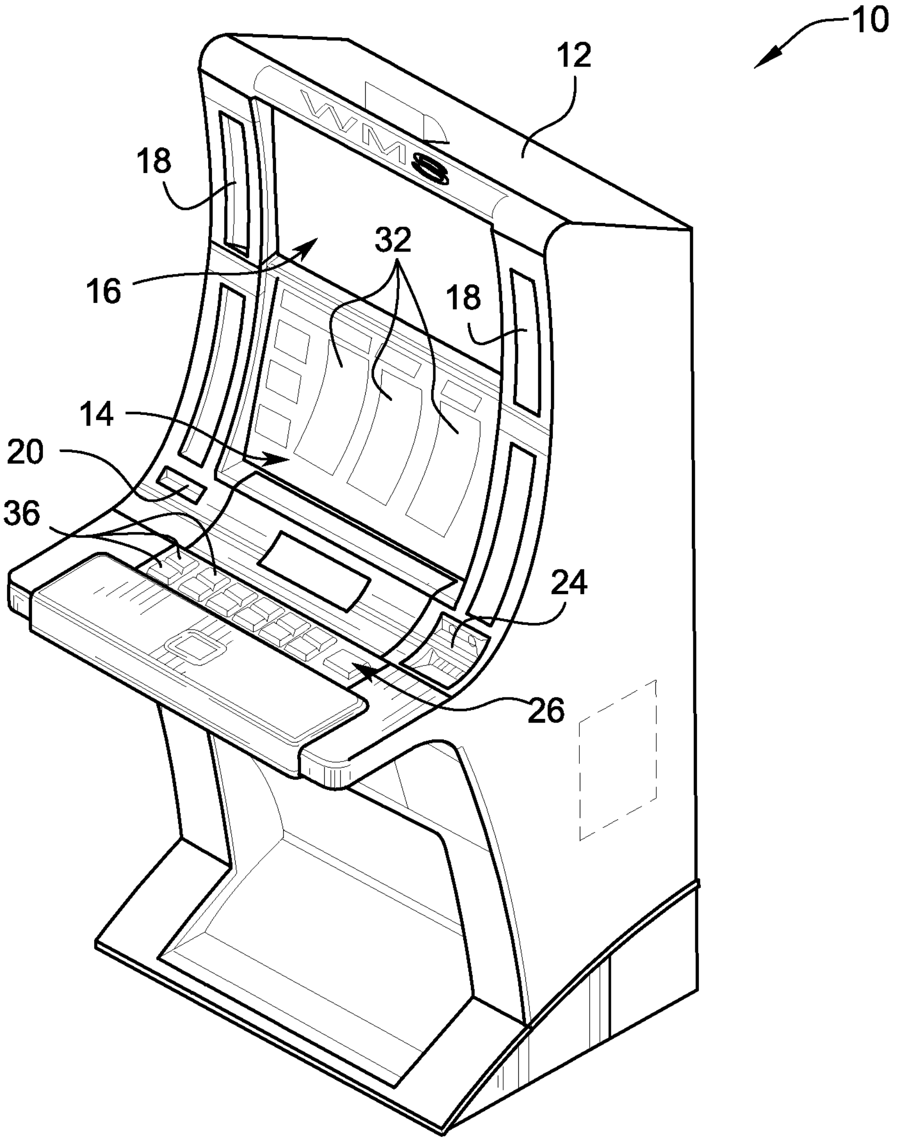
FIG. 1 is a perspective view of a free-standing gaming terminal according to an embodiment of the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is be an electromechanical gaming terminal configured to play mechanical slots, whereas in other aspects, the gaming terminal is an electronic gaming terminal configured to play a video casino game, such as slots, keno, poker, blackjack, roulette, craps, etc. It should be understood that although the gaming terminal 10 is shown as a free-standing terminal of the upright type, the gaming terminal is readily amenable to implementation in a wide variety of other forms such as a free-standing terminal of the slant-top type, a portable or handheld device primarily used for gaming, such as is disclosed by way of example in PCT Patent Application No. PCT/US2007/000792 filed Jan. 11, 2007, titled "Handheld Device for Wagering Games," which is incorporated herein by reference in its entirety, a mobile telecommunications device such as a mobile telephone or personal digital assistant (PDA), a counter-top or bar-top gaming terminal, or other personal electronic device, such as a portable television, MP3 player, entertainment device, etcetera.

The gaming terminal 10 illustrated in FIG. 1 comprises a cabinet or housing 12. For output devices, this embodiment of the gaming terminal 10 includes a primary display area 14, a secondary display area 16, and one or more audio speakers 18. The primary display area 14 and/or secondary display area 16 variously displays information associated with wagering games, non-wagering games, community games, progressives, advertisements, services, premium entertainment, text messaging, emails, alerts or announcements, broadcast information, subscription information, etc. appropriate to the particular mode(s) of operation of the gaming terminal. For input devices, the gaming terminal 10 illustrated in FIG. 1 includes a bill validator 20, a coin acceptor (not shown), one or more information readers 24, one or more player-input devices 26, and one or more player-accessible ports 28 (e.g., an audio output jack for headphones, a video headset jack, a wireless transmitter/receiver, etc., shown in FIG. 2). While these typical components found in the gaming terminal 10 are described below, it should be understood that numerous other peripheral devices and other elements exist and are readily utilizable in any number of combinations to create various forms of a gaming terminal in accord with the present concepts.

The primary display area 14 includes, in various aspects of the present concepts, a mechanical-reel display, a video display, or a combination thereof in which a transmissive video display is disposed in front of the mechanical-reel display to portray a video image in superposition over the mechanical-reel display. Further information concerning the latter construction is disclosed in U.S. Pat. No. 6,517,433 to Loose et al. entitled "Reel Spinning Slot Machine With Superimposed Video Image," which is incorporated herein by reference in its entirety. The video display is, in various embodiments, a cathode ray tube (CRT), a high-resolution liquid crystal display (LCD), a plasma display, a light emitting diode (LED), a DLP projection display, an electroluminescent (EL) panel, or any other type of display suitable for use in the gaming terminal 10, or other form factor, such as is shown by way of example in FIG. 1. The primary display area 14 includes, in relation to many aspects of wagering games conducted on the gaming terminal 10, one or more paylines 30 (see FIG. 3) extending along a portion of the primary display area. In the illustrated embodiment of FIG. 1, the primary display area 14 comprises a plurality of mechanical reels 32 and a video display 34 (see FIG. 2), such as a transmissive display (or a reflected image arrangement in other embodiments), in front of the mechanical reels 32. If the wagering game conducted via the gaming terminal 10 relies upon the video display 34 only and not the mechanical reels 32, the mechanical reels 32 are optionally removed from the interior of the terminal and the video display 34 is advantageously of a non-transmissive type. Similarly, if the wagering game conducted via the gaming terminal 10 relies only upon the mechanical reels 32, but not the video display 34, the video display 34 depicted in FIG. 1 is replaced with a conventional glass panel. Further, in still other embodiments, the video display 34 is disposed to overlay another video display, rather than a mechanical-reel display, such that the primary display area 14 includes layered or superimposed video displays. In yet other embodiments, the mechanical-reel display of the above-noted embodiments is replaced with another mechanical or physical member or members such as, but not limited to, a mechanical wheel (e.g., a roulette game), dice, a pachinko board, or a diorama presenting a three-dimensional model of a game environment.

Video images in the primary display area 14 and/or the secondary display area 16 are rendered in two-dimensional (e.g., using Flash Macromedia™) or three-dimensional graphics (e.g., using Renderware™). In various aspects, the video images are played back (e.g., from a recording stored on the gaming terminal 10), streamed (e.g., from a gaming network), or received as a TV signal (e.g., either broadcast or via cable) and such images can take different forms, such as animated images, computer-generated images, or "real-life" images, either prerecorded (e.g., in the case of marketing/promotional material) or as live footage. The format of the video images can include any format including, but not limited to, an analog format, a standard digital format, or a high-definition (HD) digital format.

The player-input or user-input device(s) 26 include, by way of example, a plurality of buttons 36 on a button panel, as shown in FIG. 1, a mouse, a joy stick, a switch, a microphone, and/or a touch screen mounted over the primary display area 14 and/or the secondary display area 16 and having one or more soft touch keys. In still other aspects, the player-input devices 26 comprise technologies that do not rely upon physical contact between the player and the gaming terminal, such as speech-recognition technology, gesture-sensing technology, eye-tracking technology, etc. The player-input or user-input device(s) 26 thus accept(s) player input(s) and transforms the player input(s) to electronic data signals indicative of a player input or inputs corresponding to an enabled feature for such input(s) at a time of activation (e.g., pressing a "Max Bet" button or soft key to indicate a player's desire to place a maximum wager to play the wagering game). The input(s), once transformed into electronic data signals, are output to a CPU or controller 42 (see FIG. 2) for processing. The electronic data signals are selected from a group consisting essentially of an electrical current, an electrical voltage, an electrical charge, an optical signal, an optical element, a magnetic signal, and a magnetic element.

The information reader 24 (or information reader/writer) is preferably located on the front of the housing 12 and comprises, in at least some forms, a ticket reader, card reader, bar code scanner, wireless transceiver (e.g., RFID, Bluetooth, etc.), biometric reader, or computer-readable-storage-medium interface. As noted, the information reader may comprise a physical and/or electronic writing element to permit writing to a ticket, a card, or computer-readable-storage-medium. The information reader 24 permits information to be transmitted from a portable medium (e.g., ticket, voucher, coupon, casino card, smart card, debit card, credit card, etc.) to the information reader 24 to enable the gaming terminal 10 or associated external system to access an account associated with cashless gaming, to facilitate player tracking or game customization, to retrieve a saved-game state, to store a current-game state, to cause data transfer, and/or to facilitate access to casino services, such as is more fully disclosed, by way of example, in U.S. Patent Publication No. 2003/0045354, published on Mar. 6, 2003, entitled "Portable Data Unit for Communicating With Gaming Machine Over Wireless Link," which is incorporated herein by reference in its entirety. The noted account associated with cashless gaming is, in some aspects of the present concepts, stored at an external system 46 (see FIG. 2) as more fully disclosed in U.S. Pat. No. 6,280,328 to Holch et al. entitled "Cashless Computerized Video Game System and Method," which is incorporated herein by reference in its entirety, or is alternatively stored directly on the portable storage medium. Various security protocols or features can be used to enhance security of the portable storage medium. For example, in some aspects, the individual carrying the portable storage medium is required to enter a secondary independent authenticator (e.g., password, PIN number, biometric, etc.) to access the account stored on the portable storage medium.

Figure 2:
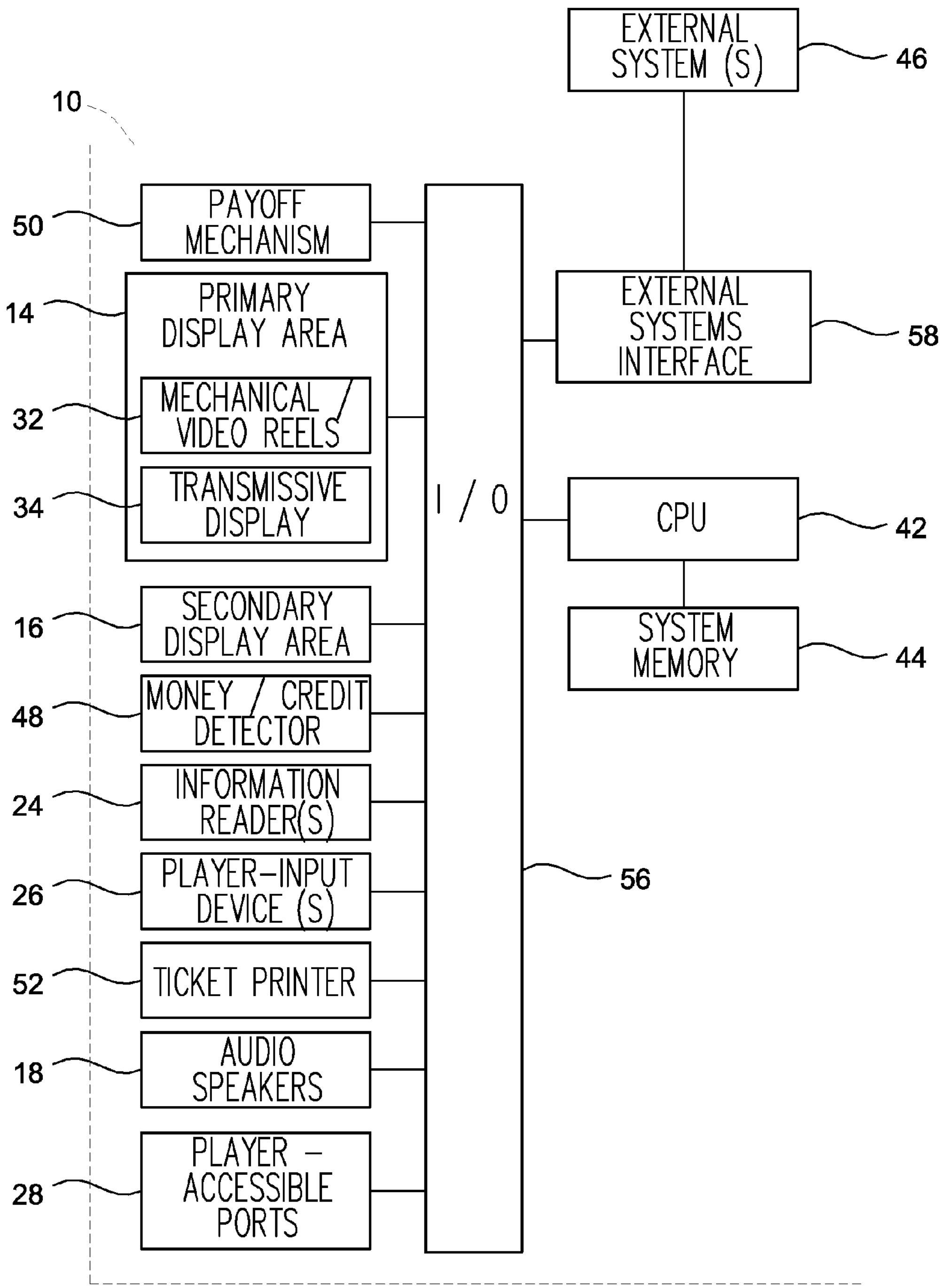
FIG. 2 (PRIOR ART)
FIG. 2 is a schematic view of a gaming system according to an embodiment of the present invention.

Turning now to FIG. 2, the various components of the gaming terminal 10 are controlled by one or more processors (e.g., CPU, distributed processors, etc.) 42, also referred to herein generally as a controller (e.g., microcontroller, microprocessor, etc.). The controller 42 can include any suitable processor(s), such as an Intel® Pentium processor, Intel® Core 2 Duo processor, AMD Opteron™ processor, or UltraSPARC® processor. By way of example, the controller 42 includes a plurality of microprocessors including a master processor, a slave processor, and a secondary or parallel processor. Controller 42, as used herein, comprises any combination of hardware, software, and/or firmware disposed in and/or disposed outside of the gaming terminal 10 that is configured to communicate with and/or control the transfer of data between the gaming terminal 10 and a bus, another computer, processor, or device and/or a service and/or a network. The controller 42 comprises one or more controllers or processors and such one or more controllers or processors need not be disposed proximal to one another and may be located in different devices and/or in different locations. For example, a first processor is disposed proximate a user interface device (e.g., a push button panel, a touch screen display, etc.) and a second processor is disposed remotely from the first processor, the first and second processors being electrically connected through a network. As another example, the first processor is disposed in a first enclosure (e.g., a gaming machine) and a second processor is disposed in a second enclosure (e.g., a server) separate from the first enclosure, the first and second processors being communicatively connected through a network. The controller 42 is operable to execute all of the various gaming methods and other processes disclosed herein.

To provide gaming functions, the controller 42 executes one or more game programs comprising machine-executable instructions stored in local and/or remote computer-readable data storage media (e.g., memory 44 or other suitable storage device). The term computer-readable data storage media, or "computer-readable medium," as used herein refers to any media/medium that participates in providing instructions to controller 42 for execution. The computer-readable medium comprises, in at least some exemplary forms, non-volatile media (e.g., optical disks, magnetic disks, etc.), volatile media (e.g., dynamic memory, RAM), and transmission media (e.g., coaxial cables, copper wire, fiber optics, radio frequency (RF) data communication, infrared (IR) data communication, etc). Common forms of computer-readable media include, for example, a hard disk, magnetic tape (or other magnetic medium), a 2-D or 3-D optical disc (e.g., a CD-ROM, DVD, etc.), RAM, PROM, EPROM, FLASH-EPROM, any other memory chip or solid state digital data storage device, a carrier wave, or any other medium from which a computer can read. By way of example, a plurality of storage media or devices are provided, a first storage device being disposed proximate the user interface device and a second storage device being disposed remotely from the first storage device, wherein a network is connected intermediate the first one and second one of the storage devices.

Various forms of computer-readable media may be involved in carrying one or more sequences of one or more instructions to controller 42 for execution. By way of example, the instructions may initially be borne on a data storage device of a remote device (e.g., a remote computer, server, or system). The remote device can load the instructions into its dynamic memory and send the instructions over a telephone line or other communication path using a modem or other communication device appropriate to the communication path. A modem or other communication device local to the gaming terminal 10 or to an external system 46 associated with the gaming machine can receive the data on the telephone line or conveyed through the communication path (e.g., via external systems interface 58) and output the data to a bus, which transmits the data to the system memory 44 associated with the processor 42, from which system memory the processor retrieves and executes the instructions.

Thus, the controller 42 is able to send and receive data, via carrier signals, through the network(s), network link, and communication interface. The data includes, in various examples, instructions, commands, program code, player data, and game data. As to the game data, in at least some aspects of the present concepts, the controller 42 uses a local random number generator (RNG) to randomly generate a wagering game outcome from a plurality of possible outcomes. Alternatively, the outcome is centrally determined using either an RNG or pooling scheme at a remote controller included, for example, within the external system 46.

As shown in the example of FIG. 2, the controller 42 is coupled to the system memory 44. The system memory 44 is shown to comprise a volatile memory (e.g., a random-access memory (RAM)) and a non-volatile memory (e.g., an EEPROM), but optionally includes multiple RAM and multiple program memories.

As shown in the example of FIG. 2, the controller 42 is also coupled to a money/credit detector 48. The money/credit detector 48 is configured to output a signal the controller 42 that money and/or credits have been input via one or more value-input devices, such as the bill validator 20 (see FIG. 1), the coin acceptor, or via other sources, such as a cashless gaming account, etc. The value-input device(s) is integrated with the housing 12 of the gaming terminal 10 and is connected to the remainder of the components of the gaming terminal 10, as appropriate, via a wired connection, such as I/O 56, or wireless connection. The money/credit detector 48 detects the input of valid funds into the gaming terminal 10 (e.g., via currency, electronic funds, ticket, card, etc.) via the value-input device(s) and outputs a signal to the controller 42 carrying data regarding the input value of the valid funds. The controller 42 extracts the data from these signals from the money/credit detector 48, analyzes the associated data, and transforms the data corresponding to the input value into an equivalent credit balance that is available to the player for subsequent wagers on the gaming terminal 10, such transforming of the data being effected by software, hardware, and/or firmware configured to associate the input value to an equivalent credit value. Where the input value is already in a credit value form, such as in a cashless gaming account having stored therein a credit value, the wager is simply deducted from the available credit balance.

As seen in FIG. 2, the controller 42 is also connected to, and controls, the primary display area 14, the player-input device (s) 26, and a payoff mechanism 50. The payoff mechanism 50 is operable in response to instructions from the controller 42 to award a payoff to the player in response to certain winning outcomes that occur in the base game, the bonus game(s), or via an external game or event. The payoff is provided in the form of money, credits, redeemable points, advancement within a game, access to special features within a game, services, another exchangeable media, or any combination thereof. Although payoffs may be paid out in coins and/or currency bills, payoffs are alternatively associated with a coded ticket (from a ticket printer 52), a portable storage medium or device (e.g., a card magnetic strip), or are transferred to or transmitted to a designated player account. The payoff amounts distributed by the payoff mechanism 50 are determined by one or more pay tables stored in the system memory 44.

Communications between the controller 42 and both the peripheral components of the gaming terminal 10 and the external system 46 occur through input/output (I/O) circuit 56, which can include any suitable bus technologies, such as an AGTL+ frontside bus and a PCI backside bus. Although the I/O circuit 56 is shown as a single block, it should be appreciated that the I/O circuit 56 alternatively includes a number of different types of I/O circuits. Furthermore, in some embodiments, the components of the gaming terminal 10 can be interconnected according to any suitable interconnection architecture (e.g., directly connected, hypercube, etc.).

The I/O circuit 56 is connected to an external system interface or communication device 58, which is connected to the external system 46. The controller 42 communicates with the external system 46 via the external system interface 58 and a communication path (e.g., serial, parallel, IR, RC, 10 bT, near field, etc.). The external system 46 includes, in various aspects, a gaming network, other gaming terminals, a gaming server, a remote controller, communications hardware, or a variety of other interfaced systems or components, in any combination. In yet other aspects, the external system 46 may comprise a player's portable electronic device (e.g., cellular phone, electronic wallet, etc.) and the external system interface 58 is configured to facilitate wireless communication and data transfer between the portable electronic device and the controller 42, such as by a near field communication path operating via magnetic field induction or a frequency-hopping spread spectrum RF signals (e.g., Bluetooth, etc.).

The gaming terminal 10 optionally communicates with external system 46 (in a wired or wireless manner) such that each terminal operates as a "thin client" having relatively less functionality, a "thick client" having relatively more functionality, or with any range of functionality therebetween (e.g., an "intermediate client"). In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external systems 46 ("thin client" gaming terminal), or are distributed therebetween in any suitable manner ("intermediate client" gaming terminal).

Figure 3:
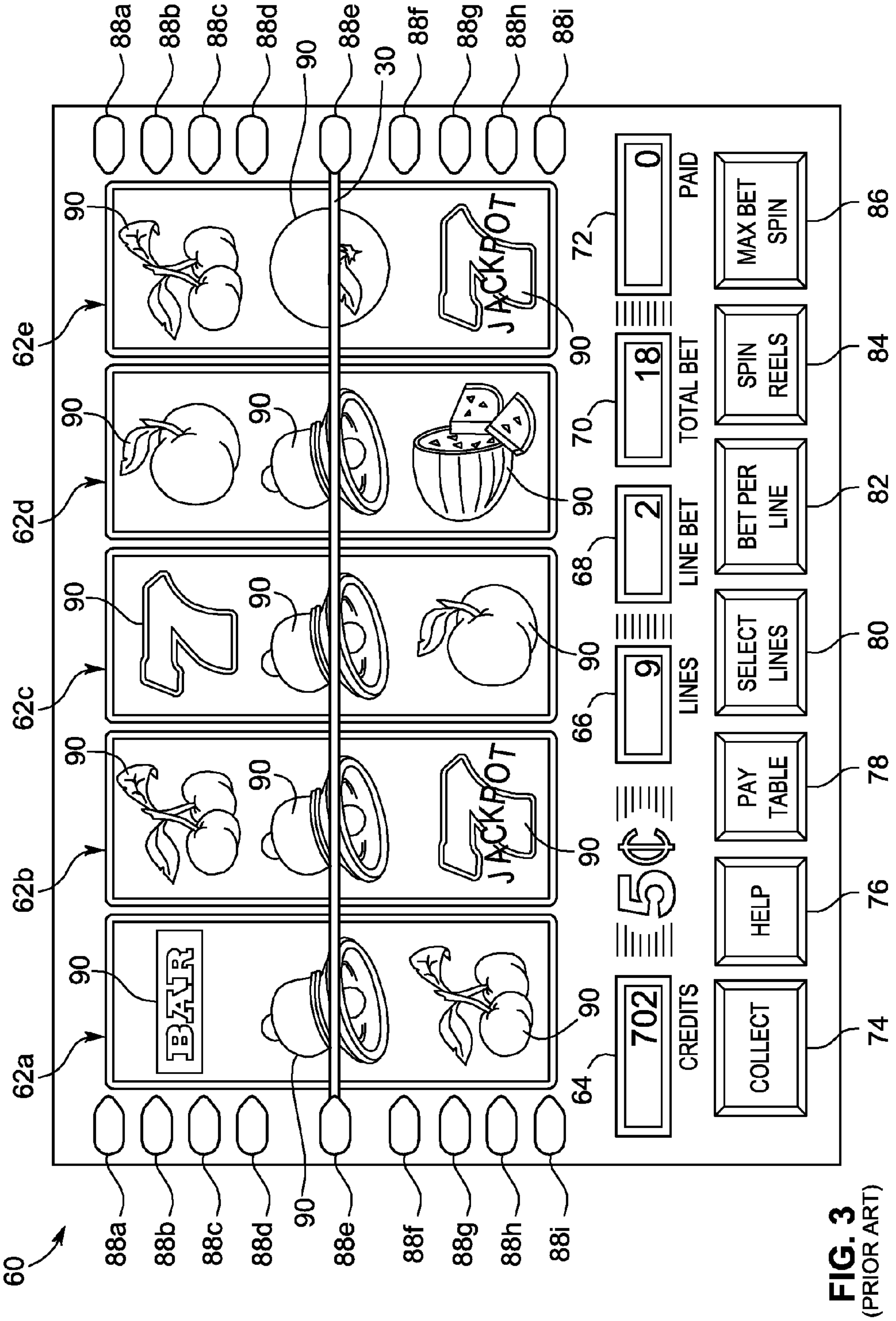
FIG. 3 (PRIOR ART)
FIG. 3 is an image of an exemplary basic-game screen of a wagering game displayed on a gaming terminal, according to an embodiment of the present invention.
Figure 4:
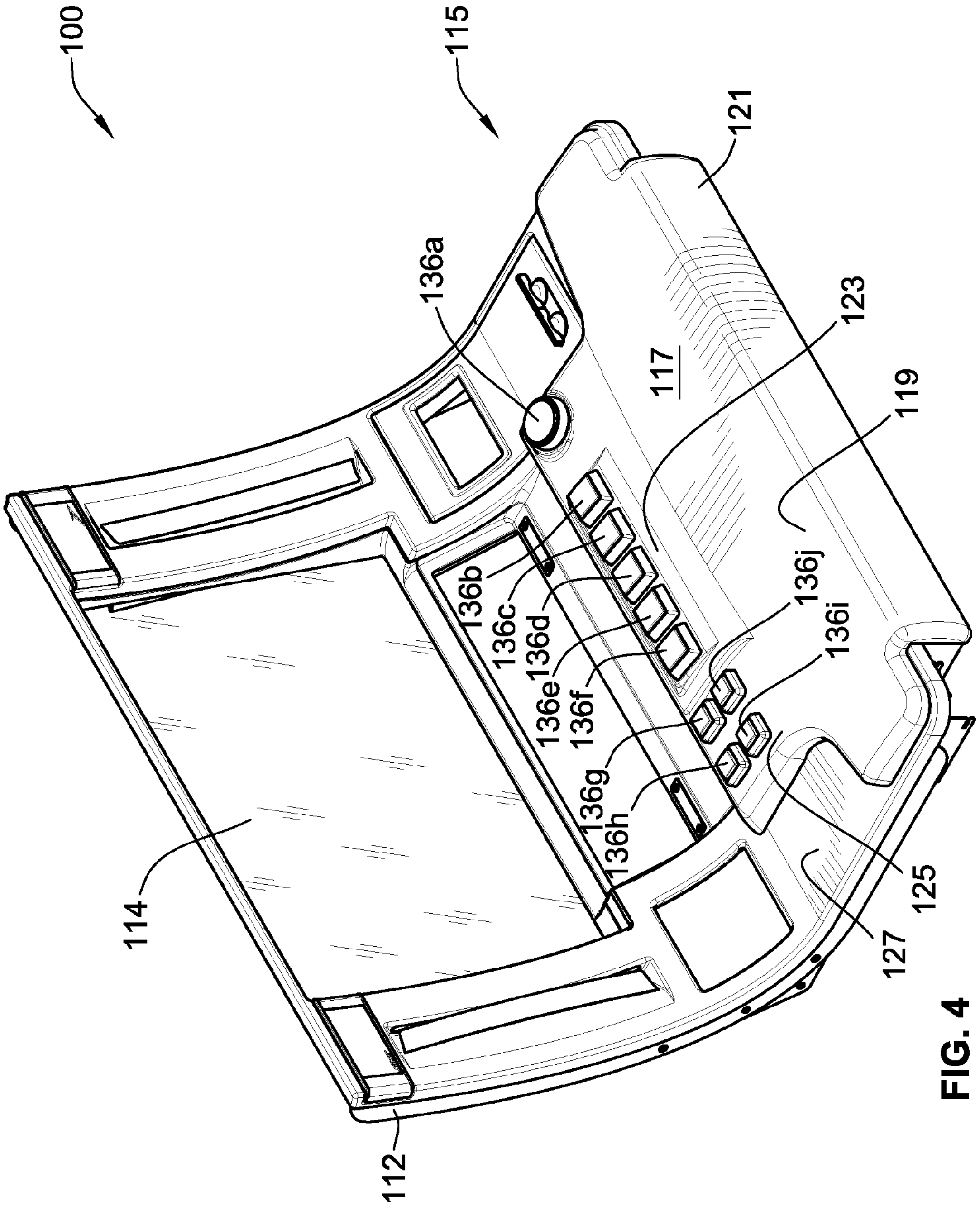
FIG. 4 is an isometric view of a display and armrest area, according to an embodiment of the present invention.
Figure 5:
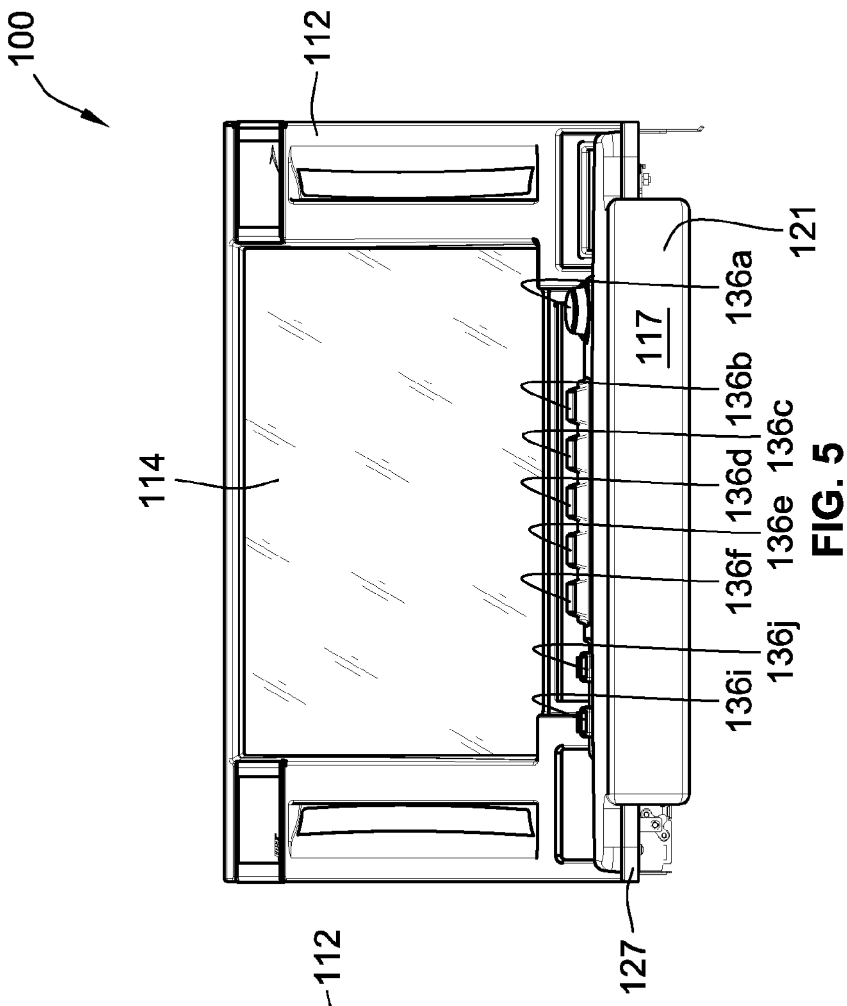
FIG. 5 is a front view of the display and armrest area.
Figure 6:
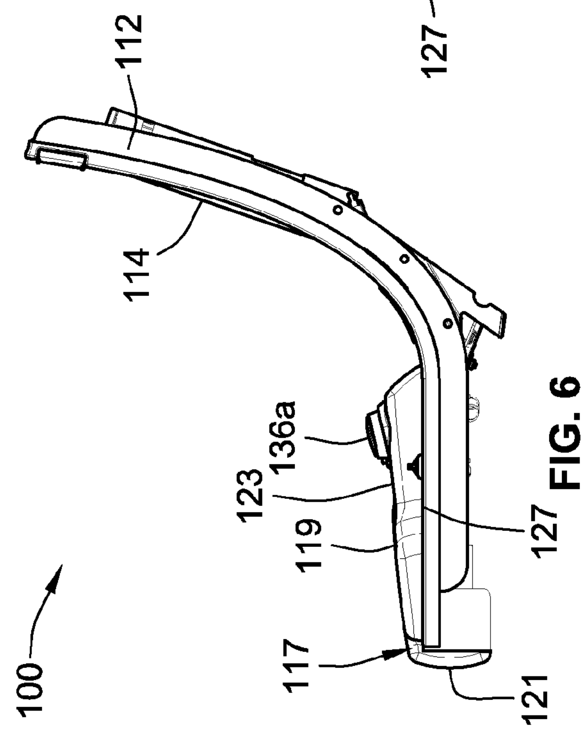
FIG. 6 is a left view of the display and armrest area.
Figure 7:
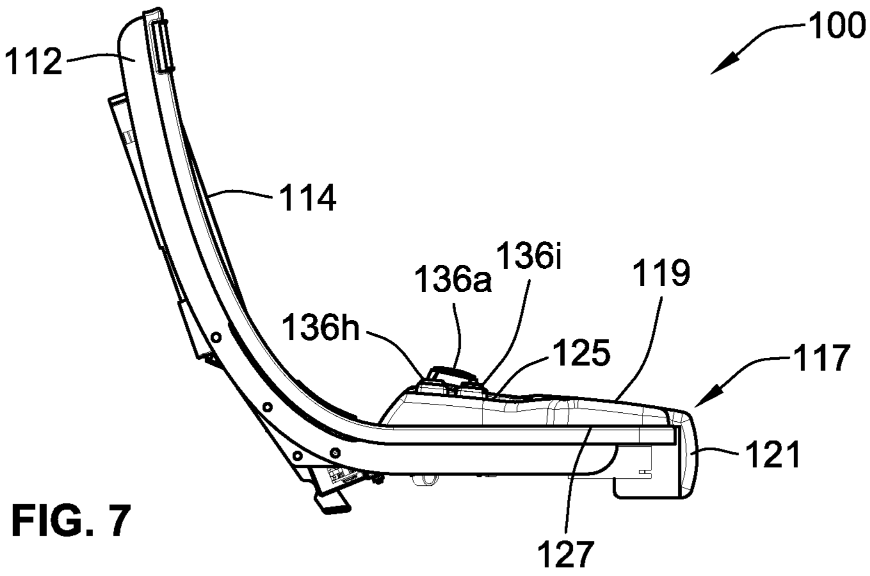
FIG. 7 is a right view of the display and armrest area.

Referring now to FIG. 3, an image of a basic-game screen 60 adapted to be displayed on the primary display area 14 is illustrated, according to one embodiment of the present invention. A player begins play of a basic wagering game by providing a wager. A player can operate or interact with the wagering game using the one or more player-input devices 26. The controller 42, the external system 46, or both, in alternative embodiments, operate(s) to execute a wagering game program causing the primary display area 14 to display the wagering game that includes a plurality of visual elements.

In accord with various methods of conducting a wagering game on a gaming system in accord with the present concepts, the wagering game includes a game sequence in which a player makes a wager, such as through the money/credit detector 48, touch screen, soft key, button panel, or the like, and a wagering game outcome is associated with the wager. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 14) through the display of information such as, but not limited to, text, graphics, text and graphics, static images, moving images, etc., or any combination thereof. In accord with the method of conducting the wagering game, the controller 42, which comprises one or more processors, transforms a physical player input, such as a player's pressing of a "Spin Reels" soft key 84 (see FIG. 3), into an electronic data signal indicative of an instruction relating to the wagering game (e.g., an electronic data signal bearing data on a wager amount).

In the aforementioned method, for each data signal, the controller 42 is configured to processes the electronic data signal, to interpret the data signal (e.g., data signals corresponding to a wager input), and to cause further actions associated with the interpretation of the signal in accord with computer instructions relating to such further actions executed by the controller. As one example, the controller 42 causes the recording of a digital representation of the wager in one or more storage devices (e.g., system memory 44 or a memory associated with an external system 46), the controller, in accord with associated computer instructions, causing the changing of a state of the data storage device from a first state to a second state. This change in state is, for example, effected by changing a magnetization pattern on a magnetically coated surface of a magnetic storage device or changing a magnetic state of a ferromagnetic surface of a magneto-optical disc storage device, a change in state of transistors or capacitors in a volatile or a non-volatile semiconductor memory (e.g., DRAM), etc.). The noted second state of the data storage device comprises storage in the storage device of data representing the electronic data signal from the controller (e.g., the wager in the present example). As another example, the controller 42 further, in accord with the execution of the instructions relating to the wagering game, causes the primary display 14 or other display device and/or other output device (e.g., speakers, lights, communication device, etc.), to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by the RNG) that is used by the controller 42 to determine the outcome of the game sequence, using a game logic for determining the outcome based on the randomly generated number. In at least some aspects, the controller 42 is configured to determine an outcome of the game sequence at least partially in response to the random parameter.

The basic-game screen 60 is displayed on the primary display area 14 or a portion thereof. In FIG. 3, the basic-game screen 60 portrays a plurality of simulated movable reels 62*a-e*. Alternatively or additionally, the basic-game screen 60 portrays a plurality of mechanical reels or other video or mechanical presentation consistent with the game format and theme. The basic-game screen 60 also advantageously displays one or more game-session meters and various buttons adapted to be actuated by a player.

In the illustrated embodiment of FIG. 3, the game-session meters include a "credit" meter 64 for displaying a number of credits available for play on the terminal; a "lines" meter 66 for displaying a number of paylines to be played by a player on the terminal; a "line bet" meter 68 for displaying a number of credits wagered (e.g., from 1 to 5 or more credits) for each of the number of paylines played; a "total bet" meter 70 for displaying a total number of credits wagered for the particular round of wagering; and a "paid" meter 72 for displaying an amount to be awarded based on the results of the particular round's wager. The depicted user-selectable buttons include a "collect" button 74 to collect the credits remaining in the credits meter 64; a "help" button 76 for viewing instructions on how to play the wagering game; a "pay table" button 78 for viewing a pay table associated with the basic wagering game; a "select lines" button 80 for changing the number of paylines (displayed in the lines meter 66) a player wishes to play; a "bet per line" button 82 for changing the amount of the wager which is displayed in the line-bet meter 68; a "spin reels" button 84 for moving the reels 62*a-e;* and a "max bet spin" button 86 for wagering a maximum number of credits and moving the reels 62*a-e* of the basic wagering game. While the gaming terminal 10 allows for these types of player inputs, the present invention does not require them and can be used on gaming terminals having more, less, or different player inputs.

As shown in the example of FIG. 3, paylines 30 extend from one of the payline indicators 88*a-i* on the left side of the basic-game screen 60 to a corresponding one of the payline indicators 88*a-i* on the right side of the screen 60. A plurality of symbols 90 is displayed on the plurality of reels 62*a-e* to indicate possible outcomes of the basic wagering game. A winning combination occurs when the displayed symbols 90 correspond to one of the winning symbol combinations listed in a pay table stored in the memory 44 of the terminal 11 or in the external system 46. The symbols 90 may include any appropriate graphical representation or animation, and may further include a "blank" symbol.

Symbol combinations are evaluated in accord with various schemes such as, but not limited to, "line pays" or "scatter pays." Line pays are evaluated left to right, right to left, top to bottom, bottom to top, or any combination thereof by evaluating the number, type, or order of symbols 90 appearing along an activated payline 30. Scatter pays are evaluated without regard to position or paylines and only require that such combination appears anywhere on the reels 62*a-e*. While an embodiment with nine paylines is shown, a wagering game with no paylines, a single payline, or any plurality of paylines will also work with the present invention. Additionally, though an embodiment with five reels is shown in FIG. 3, different embodiments of the gaming terminal 10 comprise a greater or lesser number of reels in accordance with the present invention.

Turning now to FIGS. 4-7, a display and armrest area 100 of a gaming terminal includes a primary display area 114 and an armrest panel 115. The gaming terminal can be and function generally the same as the gaming terminal 10 described above in reference to FIGS. 1-3. The armrest panel 115 is mounted to a cabinet 112 and includes a support padding 117 and a plurality of buttons 136*a*-136*j*. The buttons 136*a*-136*j* are integrated into the support padding 117.

The support padding 117 includes a wrist section 119 and a player-facing section 121. The buttons 136*a*-136*j* are located in an area between the wrist area and the primary display area 114 and are segregated in clusters in accordance with functions of the buttons. For example, a "Re-Spin" button 136*a* is isolated from the other buttons 136*b*-136*j* for easy visual and non-visual recognition. Additionally, the large "Re-Spin" button 136*a* is optionally made a different shape or size than other ones of the buttons 136*b*-136*j* to further help a player in recognizing the button. For example, in the example shown in FIG. 4 the "Re-Spin" button 136*a* is larger than the other buttons 136*b*-136*j* and is circular, instead of rectangular (e.g., square).

The clusters of buttons include a first cluster of buttons 136*b*-136*f* and a second cluster of buttons 136*g*-136*j*. The first cluster of buttons 136*b*-136*f* is positioned on a first elevation 123 and the second cluster of buttons 136*g*-136*j* is positioned on a second elevation 125. The first elevation 123 is generally higher (or elevated) relative to the second elevation 125 with respect to the wrist section 119. As such, in reference to the wrist area 119, the second cluster of buttons 136*g*-136*j* is in a recessed position relative to the first cluster of buttons 136*b*-136*f*.

The support padding 117 is elevated and sculptural to better enable desired play via the armrest panel 115. The elevation raises the buttons 136*a*-136*j* independent of a primary interface surface 127 of the cabinet 112. As such, the buttons 136*a*-136*j* are positioned in a more proximal relationship to the primary display area 114. Thus, the second cluster of buttons 136*g*-136*j* are elevated closer to the primary display area 114 than the primary interface surface 127, and the first cluster of buttons 136*b*-136*f* are elevated even closer to the primary display area 114 than the second cluster of buttons 136*g*-136*j* (with respect to the primary interface surface 127). If the wagering game is a poker game, for example, the primary display area 114 would typically show poker cards on the display. The proximal relationship of the buttons 136*a*-136*j* to the poker cards provides a player with a better suited button-display arrangement for rapid, poker play.

The armrest panel 115 can be made specific for a particular type of wagering game, such as poker, but can use the same interface of different types of gaming cabinets. For example, the armrest panel 115 can be mounted to a primary interface surface of another cabinet, which is different in size and shape than the cabinet 112 discussed above. In such an embodiment, it is assumed that a first gaming terminal has a first cabinet with a first display configured to show a first outcome of a first wagering game. A second gaming terminal has a second cabinet with a second display configured to show a second outcome of a second wagering game. While the two cabinets are different in shape or size, the primary interface surface of each cabinet is configured with mounting features for receiving the armrest panel 115. As such, the armrest panel 115 is mountable to, one at a time, either the first cabinet or the second cabinet.

Figure 8:
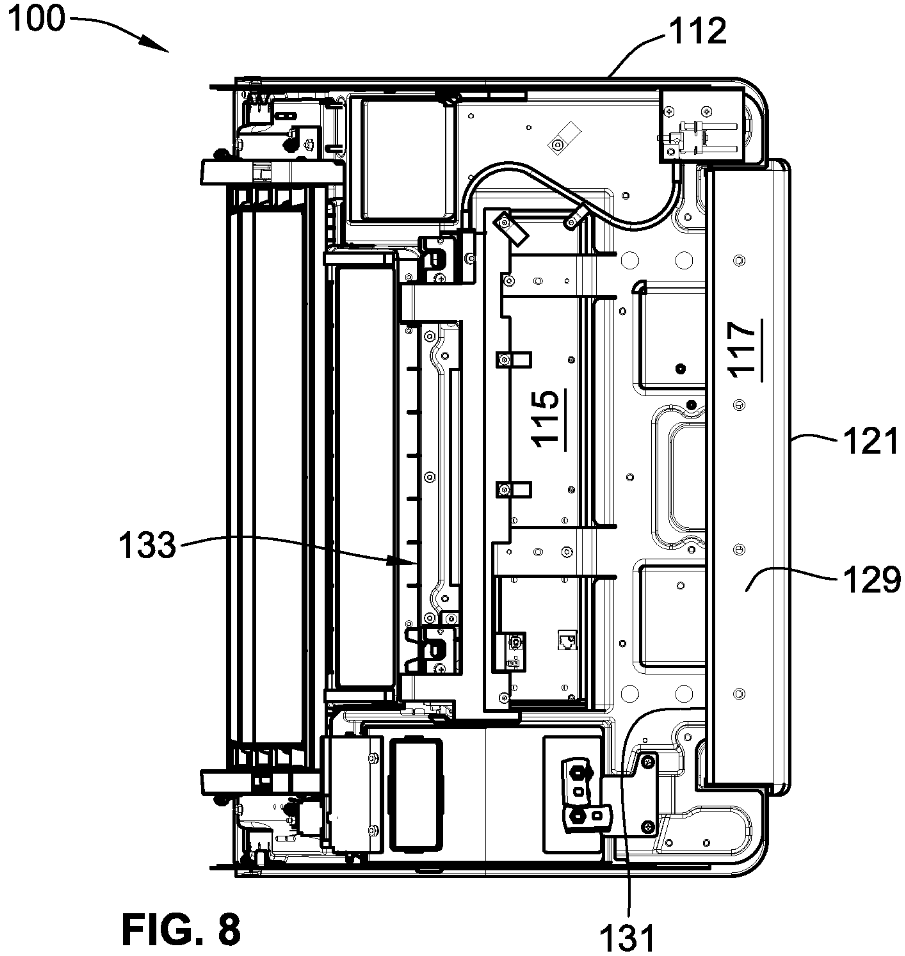
FIG. 8 is a bottom view of the display and armrest area.

Referring to FIG. 8, the support padding 117 further includes a bottom section 129 and a back section 131. The bottom section 129 is generally opposite the wrist section 119 and contiguous with the player-facing section 121, and it wraps away from a player position. The back section 131 is generally opposite to the player-facing section 121 and contiguous with the bottom section 129, and it wraps generally perpendicular towards the wrist section 119. Various internal components 133, such as electro-mechanical panel elements, are located in underside of the armrest panel 115.

Figure 9:
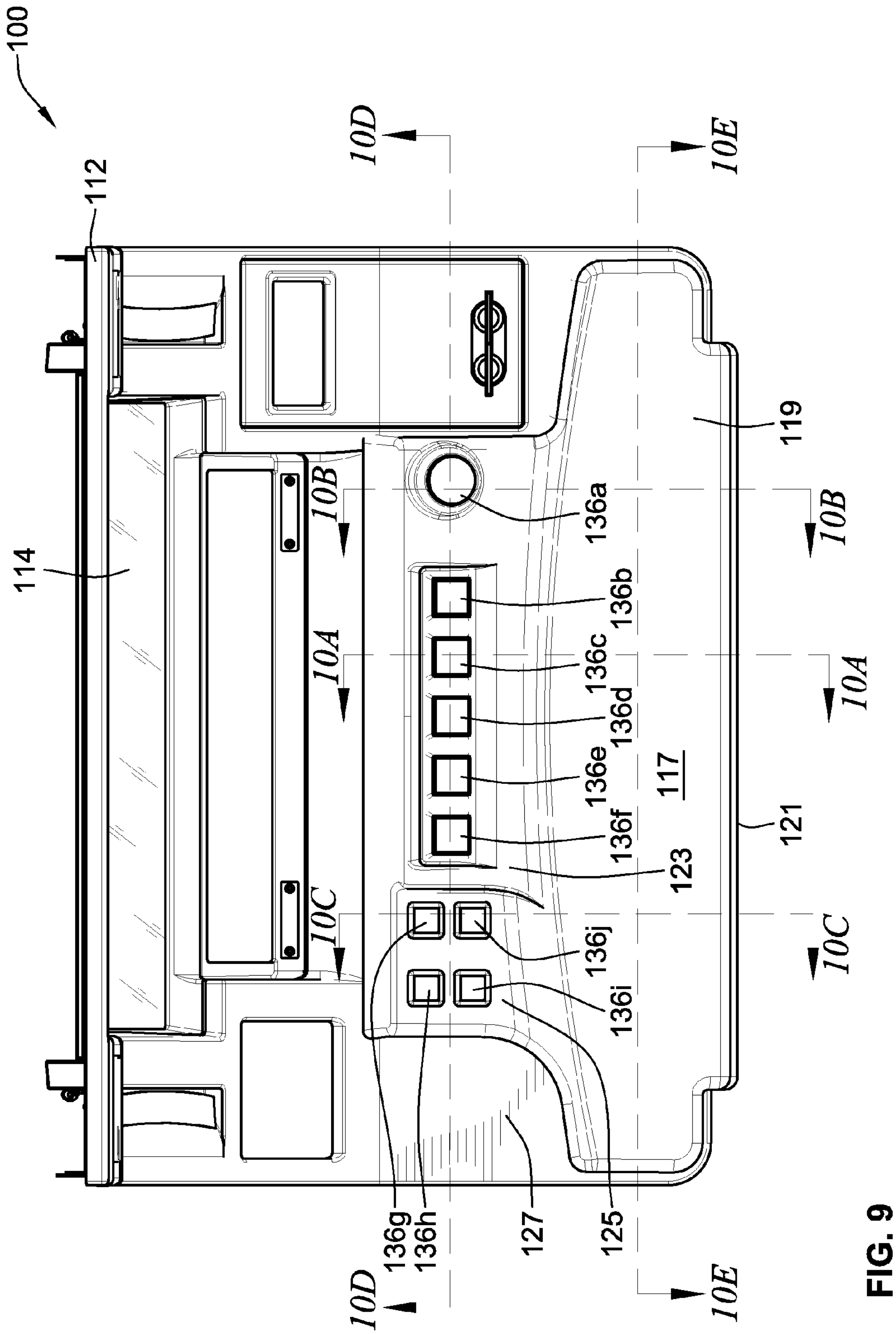
FIG. 9 is a top view of the display and armrest area.
Figure 10A:
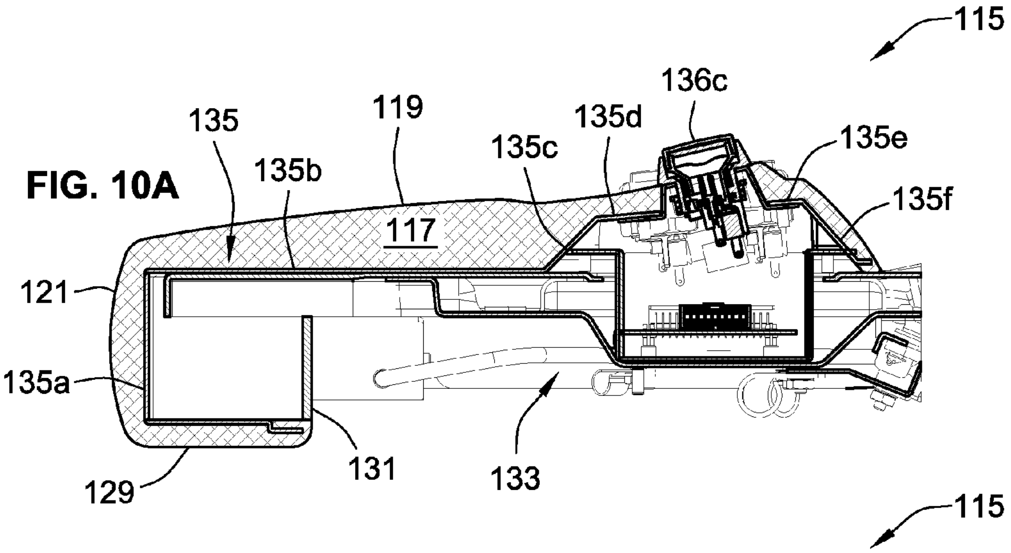
FIG. 10A is a cross-sectional view along lines A-A of FIG. 9.
Figure 10B:
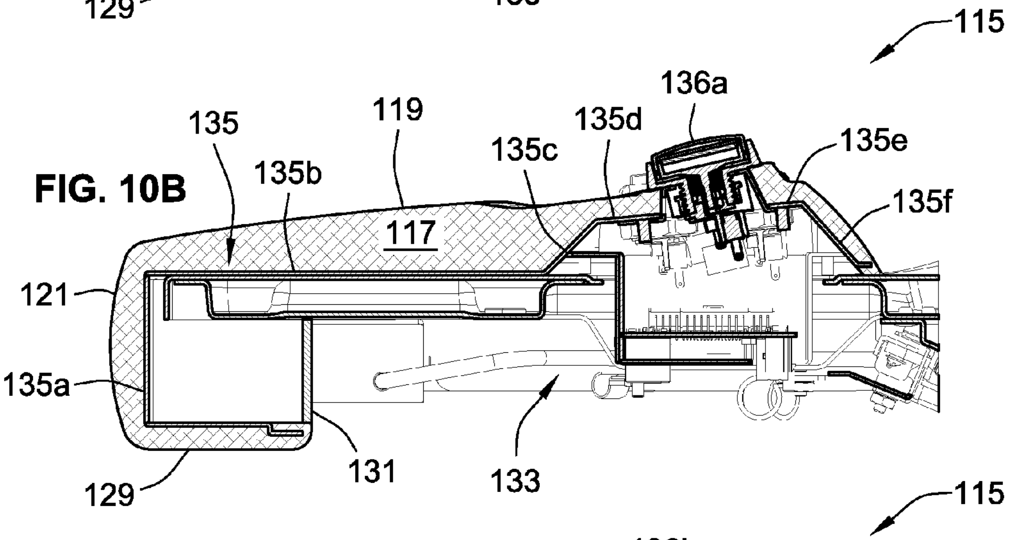
FIG. 10 B is a cross-sectional view along lines B-B of FIG. 9.
FIG. 10C is a cross-sectional view along lines C-C of FIG. 9.
FIG. 10D is a cross-sectional view along lines D-D of FIG. 9.
FIG. 10E is a cross-sectional view along lines E-E of FIG. 9.
Figure 10C:
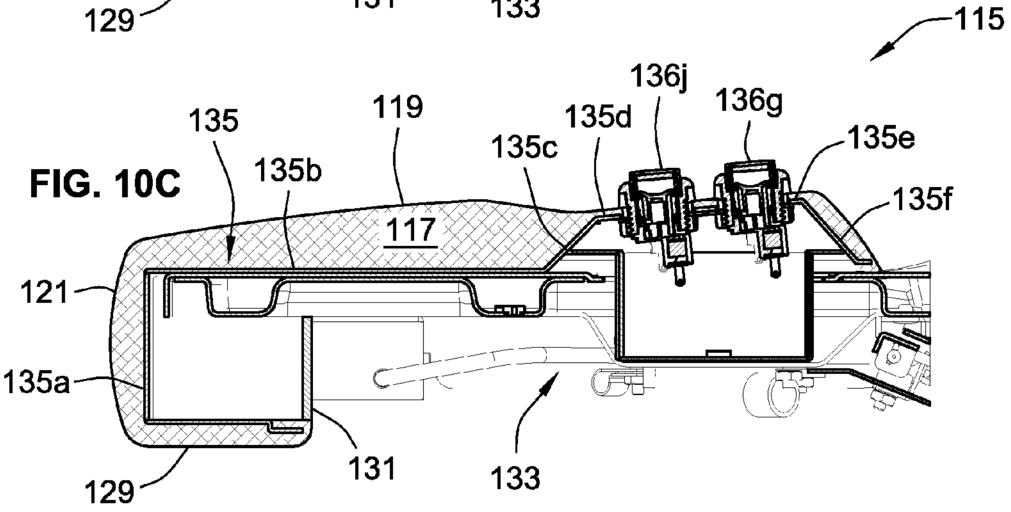
Figure 10D:
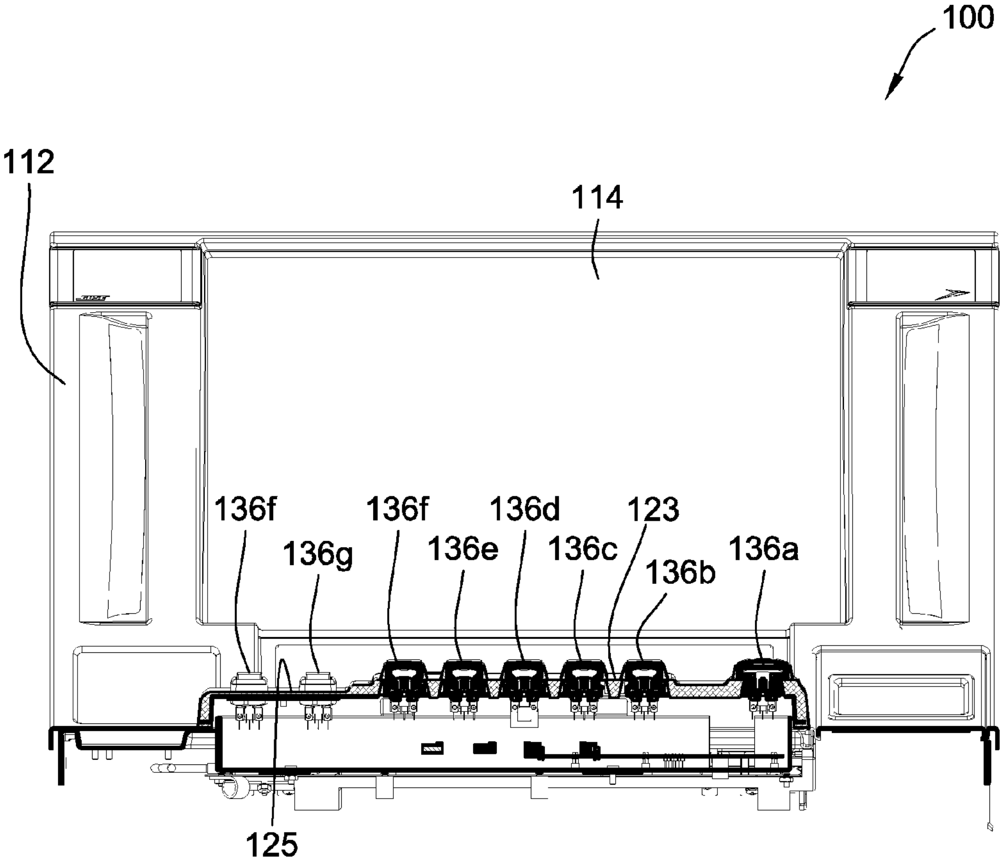
Figure 10E:
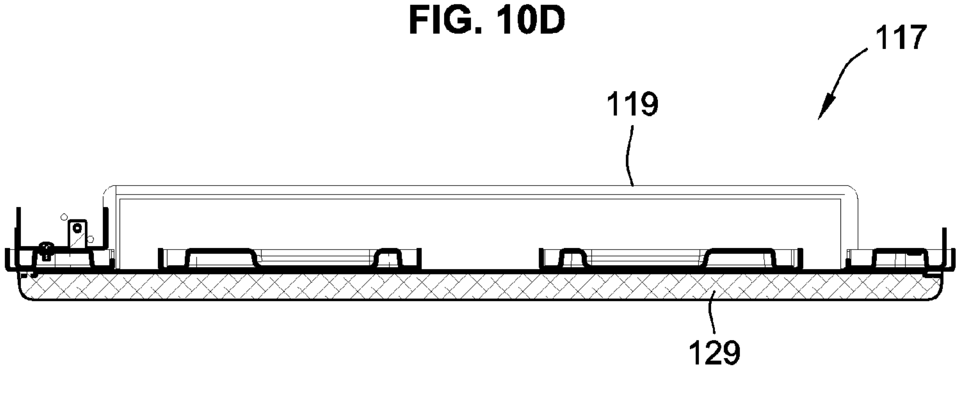

Turning to FIG. 9, a number of cross-sectional views FIGS. 10A-10E are used to explain in more detail aspects of the armrest panel 115. Referring specifically to FIGS. 10A-10C, the support padding 117 is made from a soft material. For example, a urethane material is used to produce the support padding 117 using urethane molding methods. In other examples, the support padding 117 can include a number of different materials, textures, and ornamental decorations. For example, the support padding 117 can include various integrated firm and soft areas, e.g., leather material supported by a soft substrate.

The support padding 117 maintains a nominal and uniform wall thickness for economy, but allows selectively thicker section in important areas for improving comfort for the player. For example, the wrist section 119 has a wall thickness that is greater than the wall thickness of the player-facing section 121. The increased thickness of the wrist section 119 provides extra support and comfort for the players' hands. Since less padding is required between the player and the gaming machine 100, the thickness of the player-facing section 121 is decreased relative to the wrist section 119. In turn, the bottom section 129 and the back section 131 require even less padding and, as such, their respective thickness is further reduced relative to the thickness of the player-facing section 121. Thus, the wall thickness of the support padding 117 varies along a cross-section of the support padding 117.

For structural support, the armrest panel 115 further includes a structural substrate 135 for supporting the support padding 117. The structural substrate 135 is generally a three-dimensional sheet (e.g., a sheet metal) that fills internal volume of the armrest panel 115 and, in addition to supporting the support padding 117, also functionally houses the internal components 133. The structural substrate has a generally constant thickness that is much thinner than the nominal wall thickness of the support padding 117.

The structural substrate 135 includes several sections that typically (but not necessarily) match one or more of the sections of the support padding 117. As the thickness of a particular section of the support padding 117 may vary, the counterpart section of the structural substrate 135 is shaped to delineate an interior surface of the respective section of the support padding 117. For example, the player-facing section 121 has an interior surface that is generally linear and flat. As such, a counterpart player-facing section 135*a* of the structural substrate 135 delineates the internal contour of the player-facing section 121.

In contrast to the player-facing section 121, the wrist section 119 has an interior surface contour that changes (i.e., is elevated towards the external surface) in the area next to the buttons 136*a*-136*j*. To elevate the buttons 136*a*-136*j*, and delineate the internal contour of the wrist section 119, the structural substrate 135 includes a plurality of counterpart wrist sections 135*b*-135*f*. The counterpart wrist sections 135*b*-135*f* include a first wrist section 135*b*, which is generally horizontal, that is adjacent to a second wrist section 135*c*, which is angled at an elevated angle towards the exterior surface of the support padding 117. The second wrist section 135*c* is adjacent to a third wrist section 135*d*, which is generally at an angle that is less elevated than the second wrist section 135*c* and is adjacent to a respective one of the buttons 136*a*-136*j*. A fourth wrist section 135*e* and a fifth wrist section 135*f* are positioned next to a back side of the buttons 136*a*-136*j*.

The combination of the support padding 117 and the structural substrate 135 makes possible an easily customized interface that present an ideal button placement for various thematic games and cabinet types. For example, based on its three-dimensional geometry (including differences in elevation used in conjunction with detailed features of the support padding 117), the structural substrate 135 is helpful in providing optimized angular button orientations. For example, the structural substrate 135 is helpful in providing the first elevation 123 and the second elevation 135 for the first cluster of buttons 136*b*-136*f* and the second cluster of buttons 136*g*-136*j* that are discussed in more detail above in reference to FIGS. 4-7.

The differences in elevation of the structural substrate 135, in conjunction with the detailed molded features of the support padding 117, facilitate the segregation and demarcation of specific button clusters by function. According to one example, the first cluster of buttons 136*b*-136*f* can be play-related buttons (e.g., "Hold" buttons in a poker game) that are positioned in a more elevated position towards the player for ease of play. According to another example, the second cluster of buttons 136*g*-136*j* can be administrative buttons (e.g., "Cash-Out", "Max-Bet," "Service," or "Help" buttons) that are positioned in a recessed position away from the player to prevent accidental activation during play of the wagering game.

In another example, the structural substrate 135 can be made from a molded plastic material to allow for additional unique molded geometrical features. Optionally, the structural substrate 135 can be integrated with the support padding 117 such that the two separate components become a single integrated component.

Instead of or in addition to the buttons 136*a*-136*j* being mounted at different elevations, one or more of the buttons can be mounted at different angles (or tilted) than other ones of the buttons. For example, the large "Re-Spin" button 136*a* (FIG. 10B) is mounted at a different angle than buttons of the second cluster of buttons 136*g*-136*j* (FIG. 10C). Specifically, in this example, the large "Re-Spin" button 136*a* is angled more towards the position in which the player is located. In contrast, the buttons of the second cluster of buttons 136*g*-136*j* are generally at an angle closer to a horizontal plane.

The inclined angle of the large "Re-Spin" button 136*a* enhances ease of play, comfort, and convenience for the player. For example, the inclined angle places the large "Re-Spin" button 136*a* in a more aligned angle relative to the angle of the primary display area 114 for allowing the player to easily switch the viewing focus between the primary display area 114 and the large "Re-Spin" button 136*a*. As such, the player's attention to play of the wagering game can continue generally uninterrupted by the need to focus on which button to press and where the button is located.

The support padding 117 facilitates various combinations of elevation and angle for any of the plurality of buttons 136*a*-136*j*. For example, buttons of the first cluster of buttons 136*b*-136*f* can be at the same elevation and can have the same angle, can be at the same elevation and can have a different angle, or can be at different elevations and can have the same angle.

The function of the buttons 136*a*-136*j* may be a factor in determining the tilting of respective buttons. For example, play-related buttons (e.g., the "Re-Spin" button 136*a* and the first cluster of buttons 136*b*-136*f*) may be tilted more than administrative buttons (e.g., buttons of the second cluster of buttons 136*g*-136*j*). Furthermore, each of the play-related buttons may be uniquely tilted (in comparison to other ones of the play-related buttons) to facilitate specific game-play requirements.

Figure 11A:
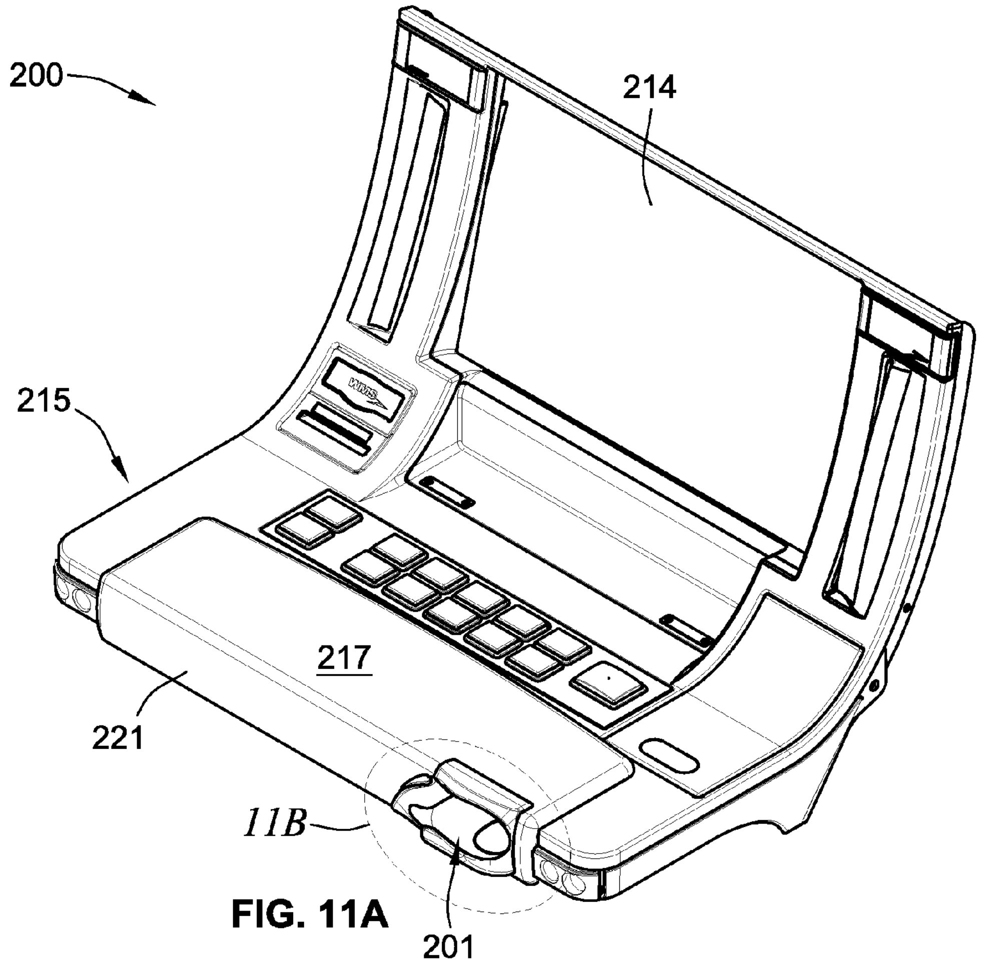
FIG. 11A is an isometric view of a display and armrest area with a wand assembly, according to an embodiment of the present invention.
Figure 11B:
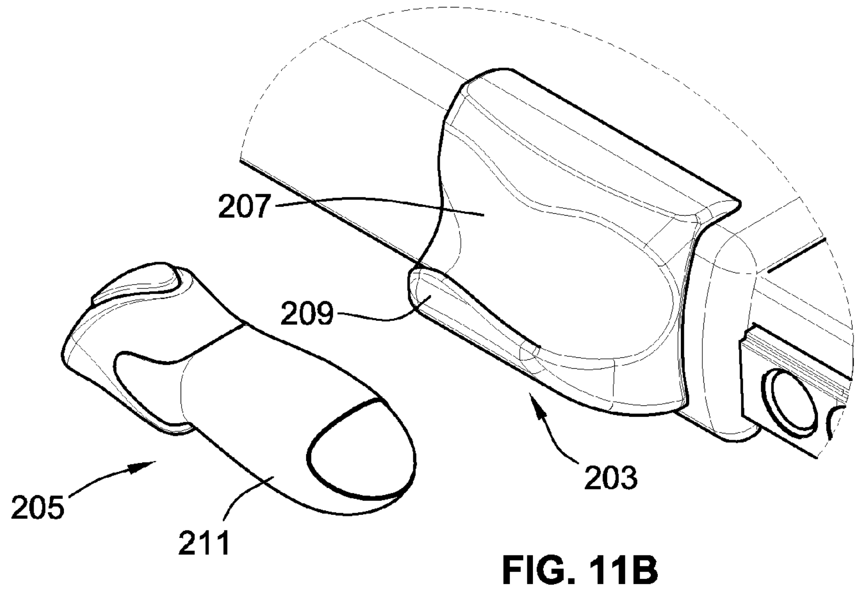
FIG. 11B is an enlarged view of the wand assembly.

Referring to FIGS. 11A and 11B, a display and armrest areas 200 of a gaming terminal includes a primary display area 214 and an armrest panel 215. The armrest panel 215 includes a wand assembly 201 having a wand holder 203 and a wand 205. The wand holder 203 is mounted to the armrest panel 215 along a player-facing area 221 of a support padding 217.

The wand 205 is removably supported by the wand holder 203 such that a player can easily remove the wand 205 as desired. For example, the wand 205 is press-fitted or snap-fitted into a receiving area 207 of the wand holder 203. When the wand 205 is located in the receiving area 207, a retaining side 209 holds the wand 205 in place. After removal, the player typically holds the wand 205 by a base portion 211 and uses the wand 205 to interact with a wagering game being displayed on the primary display area 214.

Each of these embodiments and obvious variations thereof is contemplated as falling within the spirit and scope of the claimed invention, which is set forth in the following claims.

What is claimed is:

1. A gaming system comprising:
- a cabinet;
- at least one display mounted to the cabinet and configured to display an outcome of a wagering game, the outcome being randomly selected from a plurality of outcomes in response to receiving a wager;
- an armrest panel mounted to the cabinet and including
  - a support padding having a wall thickness defined by an exterior surface and an interior surface, the wall thickness varying along a cross-section of the support padding; and
  - a plurality of buttons integrated in the support padding for receiving inputs from a player, the plurality of buttons including a first button mounted at a first elevation of the support padding and a second button mounted at a second elevation of the support padding, the first elevation being higher than the second elevation relative to the interior surface.

2. The gaming system of claim 1, wherein the support padding is selected from a group consisting of a urethane material and a leather material.

3. The gaming system of claim 1, wherein the support padding has a plurality of sections along the cross-section, the plurality of sections including a wrist section and a player-facing section.

4. The gaming system of claim 3, wherein the wall thickness of each of the wrist section and the player-facing section is greater than the wall thickness of other sections of the plurality of sections.

5. The gaming system of claim 3, wherein each of the plurality of sections has a generally nominal and uniform wall thickness.

6. The gaming system of claim 1, wherein the interior surface of the support padding is directly attached to a structural substrate, the structural substrate being shaped to delineate the contour of the interior surface, the structural substrate being either a sheet metal of constant thickness or a molded plastic material.

7. The gaming system of claim 1, wherein the plurality of buttons includes button clusters segregated in accordance with button functions.

8. The gaming system of claim 1, wherein the first button is mounted at a different angle than the second button.

9. The gaming system of claim 1, wherein the plurality of buttons includes a third button mounted at the first elevation of the support padding, the first button being mounted at a first angle and the third button being mounted at a second angle, the first angle being different than the second angle.

10. A gaming system comprising:
- a first gaming terminal having a first cabinet and at least one first display, the first display being mounted to the first cabinet and configured to display a first outcome of a first wagering game, the first outcome being randomly selected from a first plurality of outcomes in response to receiving a first wager;
- a second gaming terminal having a second cabinet and at least one second display, the second display being mounted to the second cabinet and configured to display a second outcome of a second wagering game, the second outcome being randomly selected from a second plurality of outcomes in response to receiving a second wager; and
- an armrest panel mountable to, one at a time, the first cabinet and the second cabinet, the armrest panel including
  - a support padding having a varying wall thickness along a plurality of sections; and
  - a plurality of buttons integrated in the support padding for receiving inputs from a player, the plurality of buttons including a first cluster of buttons that is in a recessed position relative to a second cluster of buttons.

11. The gaming system of claim 10, wherein the support padding is made from a molded urethane material.

12. The gaming system of claim 10, wherein the plurality of sections includes a wrist section having a wall thickness that is greater than the wall thickness of other ones of the plurality of sections.

13. The gaming system of claim 10, wherein the support padding has a generally nominal and uniform wall thickness.

14. The gaming system of claim 10, wherein the armrest panel further includes a structural substrate for supporting the support padding.

15. The gaming system of claim 14, wherein the structural substrate is selected from a group consisting of a sheet metal and a molded plastic.

16. The gaming system of claim 14, wherein the support padding is directly attached to the structural substrate such that the structural substrate delineates the support padding.

17. A gaming terminal comprising:

a cabinet;

at least one display mounted to the cabinet and configured to display an outcome of a wagering game, the outcome being randomly selected from a plurality of outcomes in response to receiving a wager; and an armrest panel mounted to the cabinet and including a support padding having a plurality of integrated buttons, the support padding having a plurality of sections with varying wall thickness, the plurality of integrated buttons including a first button and a second button, the first button being located, with respect to a player position, in a recessed position relative to a second button.

18. The gaming terminal of claim 17, wherein the support padding has an interior surface that is supported by a structural substrate, the structural substrate enclosing internal components of the armrest panel.

19. The gaming terminal of claim 18, wherein the structural substrate is a shaped to delineate the contour of the interior surface.

20. The gaming terminal of claim 17, wherein the first button is mounted at a different angle than the second button.

* * * * *